(12) United States Patent
Zhang et al.

(10) Patent No.: US 12,174,097 B2
(45) Date of Patent: Dec. 24, 2024

(54) BUILT-IN MULTI-ZONE FAST EVENLY MIXED SAMPLING DEVICE OF SCR OUTLET FLUE

(71) Applicant: HUANENG SHANGHAI SHIDONGKOU SECOND POWER PLANT, Shanghai (CN)

(72) Inventors: Qingwen Zhang, Shanghai (CN); Chengzheng Lu, Shanghai (CN); Fei Huang, Shanghai (CN); Jianian Guan, Shanghai (CN); Xiaolei Yuan, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 419 days.

(21) Appl. No.: 17/840,647

(22) Filed: Jun. 15, 2022

(65) Prior Publication Data
US 2023/0037040 A1 Feb. 2, 2023

(30) Foreign Application Priority Data
Jul. 30, 2021 (CN) .......................... 202110876017.3

(51) Int. Cl.
*G01N 1/26* (2006.01)
*G01N 1/22* (2006.01)
(52) U.S. Cl.
CPC ............. *G01N 1/2258* (2013.01); *G01N 1/26* (2013.01); *G01N 2001/2261* (2013.01)

(58) Field of Classification Search
CPC ........................................................ G01N 1/26
See application file for complete search history.

(56) References Cited

U.S. PATENT DOCUMENTS

2011/0179769 A1* 7/2011 Zhang .................. G01N 1/2252
60/276

FOREIGN PATENT DOCUMENTS

| CN | 204495617 U | 7/2015 |
| CN | 209727552 U | 12/2019 |
| CN | 213813024 U * | 7/2021 |

* cited by examiner

*Primary Examiner* — Jamel E Williams
*Assistant Examiner* — Alex T Devito
(74) *Attorney, Agent, or Firm* — IDEA Intellectual Limited; Margaret A. Burke; Sam T. Yip (57) ABSTRACT

A built-in multi-zone fast evenly mixed sampling device of a Selective Catalytic Reduction (SCR) outlet flue is provided. The device includes: a sampling component, comprising a sampling branch pipe disposed on an outer wall of the SCR outlet flue, a sampling pool connected with the sampling branch pipe and a slanting branch pipe connected between the sampling pool and the sampling branch pipe, wherein a sampling probe is disposed on the sampling pool; a dust cleaning component, comprising a flange disposed on an upper end of the sampling branch pipe, a connecting line disposed on the flange and a suspension iron disposed on a lower end of the connecting line, wherein a lower end of the suspension iron extends out of the sampling branch pipe; and a replacement component, disposed at the sampling pool.

10 Claims, 5 Drawing Sheets

BUILT-IN MULTI-ZONE FAST EVENLY MIXED SAMPLING DEVICE OF SCR OUTLET FLUE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the technical field of outlet flue cleaning, and in particular to a built-in multi-zone fast mixed sampling device in an SCR outlet flue.

BACKGROUND OF THE INVENTION

For power dispatching in some cities (such as Shanghai), ranking devices' current environmental emissions is an important basis for allocating device annual utilization hours in the upcoming year. Whether considered from the perspective of enterprise development, or from the perspective of sustainability and emission reduction, NOx concentration should be further reduced from the ultra-low emission standard of 50 mg/m$^3$ to below 15 mg/m$^3$ in the future. Most of the existing CEMS instruments at the exit of SCR denitration devices use a single point sampling measurement method, which has some flaws, such as unrepresentative measurement values, large deviation of NOx concentration between the denitration outlet and the chimney entrance, and sampling time lag. Therefore, it is necessary to improve CEMS sampling systems.

Based on this, a built-in multi-zone fast mixed sampling device in an SCR outlet flue is provided by present invention. Chiefly, the provided device can improve the representativeness of CEMS measured values at the outlet of SCR devices, shorten the sampling lag time, and lay a good foundation for improving the controlled performance of accurate ammonia injection in denitrification to ensure deep emission reduction in the future. Furthermore, the provided device can effectively solve the problems of fly ash and ammonium bisulfate blocking the sampling pipeline due to decreased smoke temperature.

Chinese patent document CN209727552U uses physical vibration and overhaul and purge to promote ash falling in the sampling tube. However, the ash collecting tube and the sampling mother tube are set outside the flue, and the temperature drop of the smoke outside the flue causes some water vapor and ammonium bisulfate to condense on the sampling tube, and further adsorb fly ash to block the sampling tube and the flue gas probe.

Chinese patent document CN204495617U implements automatic purges of the sampling pipeline by controlling switches of the pipeline's solenoid valve set region. This method is simple and practical, but regularly checking and maintaining the solenoid valve set is necessary.

Ultimately, the current public patents focus on preventing blockages of the sampling pipeline by collecting smoke samples from various channels inside the flue and transporting them to the sampling mother tube outside the flue for analysis, but the effect is different. Due to the sampling and analysis of the mother pipe occurring outside the flue, the smoke temperature drop in the above patents' devices leads to blockage of the pipeline. In addition, the above patents do not have the ability to evenly mix smoke sampled from various channels.

SUMMARY OF THE INVENTION

The purpose of this part is to outline some aspects of embodiments of the invention and to briefly introduce some better embodiments. Some simplifications or omissions may be made in this part and in the abstract of the specification and the title of the invention in this application to avoid ambiguity of the purpose of this part, the abstract of the specification and the title of the invention, and such simplifications or omissions shall not be used to limit the scope of the invention.

In view of the above problems existing in the conventional sampling device of the SCR outlet flue, a build-in multi-zone fast mixed sampling device of the SCR outlet flue is proposed by the present invention.

In accordance to one aspect of the present invention, a built-in multi-zone fast evenly mixed sampling device of a Selective Catalytic Reduction (SCR) outlet flue is provided. The device includes: a sampling component 100, comprising a sampling branch pipe disposed on an outer wall of the SCR outlet flue, a sampling pool connected with the sampling branch pipe and a slanting branch pipe connected between the sampling pool and the sampling branch pipe, wherein a sampling probe is disposed on the sampling pool; a dust cleaning component, comprising a flange disposed on an upper end of the sampling branch pipe, a connecting line disposed on the flange and a suspension iron disposed on a lower end of the connecting line, wherein a lower end of the suspension iron extends out of the sampling branch pipe; and a replacement component, disposed at the sampling pool.

In an embodiment of the provided device, a hole matching with the connecting line is disposed on an upper end of the flange, a winding rod used for winding the connecting line is disposed on the flange, a threaded rod is disposed on an upper end of the winding rod, an end cover is rotationally connected to the flange, and a matching hole matching with the winding rod is disposed on the end cover.

In an embodiment of the provided device, a clamp block is disposed on the end cover, a thread cap is disposed in the clamp block, and an internal thread matching with thread on the thread rod is disposed in the thread cap.

In an embodiment of the provided device, the device further comprises: a mixing component, disposed in the sampling pool, wherein the mixing component comprises: a plurality of stirring rods, rotationally connected in the sampling pool; a plurality of blades, disposed on the stirring rods; and a vent hole disposed on each of the stirring blades, wherein a rear end of the vent hole is connected to a vent pipe.

In an embodiment of the provided device, the replacement component comprises: a fixed plate, rotationally connected to a side end of a bottom plate; a sliding rod, disposed at a lower end of the fixed plate; and a sliding sleeve, slidingly connected on the sliding rod, wherein a matching rod, which is slanted outwards, is fixed on the sliding sleeve, wherein a sliding block, slidingly connected on the matching rod, wherein a receiving rod is fixed on the receiving block, and a replacement part is disposed on an end of the receiving rod far away the matching rod.

In an embodiment of the provided device, the sliding rod's end extends outwards with a connecting block, and the connecting block is rotationally connected to a driving block, wherein, along with a horizontal direction, the driving block is slidingly connected with a connecting rod, wherein a connecting plate is disposed on an end of the connecting rod away from the driving block, and the connecting plate is rotationally connected with a lower end of the receiving block, wherein an elastic part is disposed between the connecting rod and the driving block, and a driving part connecting to the driving block is disposed on the fixing plate.

In an embodiment of the provided device, the replacement part comprises: a pressing block, slidingly connected to an end of the receiving rod; a pressing rod disposed on the pressing block; and a contact block, disposed on an end away from the pressing block, wherein a rotating part is disposed on an end of the receiving rod.

In an embodiment of the provided device, the rotating part comprises: a first rotating plate; and a second rotating plate rotationally connected with the first rotating plate, wherein a stepping motor connected with the second rotating plate is disposed inside the first rotating plate.

In an embodiment of the provided device, a sliding block is disposed on a lower end of the fixing plate, a conveyor belt is disposed on the bottom plate, and the sliding block is fixed on the conveyor belt.

In an embodiment of the provided device, a spring is disposed between the contact block and the receiving rod, an end of the pressing rod is provided with flanging, and an annular groove is disposed on a receiving plate.

Based on the foregoing embodiments, for example, a built-in multi-zone fast evenly mixed sampling device of a Selective Catalytic Reduction (SCR) outlet flue is used for an exit of a SCR denitration device of a 660 MW coal-fired unit. Eight smoke (flue gas) sampling tubes are installed in the flue duct section of the reactor outlet on each side of the SCR device, each sampling tube is inserted into the flue duct section of the outlet according to two specifications (L=1400 mm, 3100 mm, diameter φ57×3.5 mm) and samples smoke sampling in multiple zones as set. Each sampling branch pipe is incorporated into the horizontally installed sampling mother pipe (φ157×3.5 mm) for initial mixing, the sampling mother tube turns downward and enters the fast evenly mixed sampling pool (φ325×11 mm), and further slows down the mixing. Then, the sampling mother tube vertically passes through the bottom of the flue, access to the dust collector inlet flue, such that a suction force is generated by the differential pressure of flue gas between the denitration outlet and the inlet of the dust collector. The sampling and mixing of CEMS flue gas are completed inside the flue. After this modification, the flue gas (NOx concentration and ammonia escape concentration) sampling's representativeness, accuracy, and timeliness are significantly enhanced, and there is no obvious ash accumulation therein during one maintenance cycle.

BRIEF DESCRIPTION OF THE DRAWINGS

Embodiments of the invention are described in more details hereinafter with reference to the drawings, in which.

DETAILED DESCRIPTION

In the following description, a built-in multi-zone fast evenly mixed sampling device of a SCR outlet flue is set forth as a preferred example. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention will be described in detail with reference to the schematic diagrams. When describing the embodiments of the present invention in detail, for the convenience of explanation, the cross-sectional views showing the device structure will not be partially enlarged according to the general scale, and the schematic diagrams are only examples, which should not limit the present invention. scope of protection. In addition, the three-dimensional spatial dimensions of length, width and depth should be included in the actual production.

Meanwhile, in the description of the present invention, it should be noted that the orientation or positional relationship indicated in terms such as "upper, lower, inner and outer" is based on the orientation or positional relationship shown in the accompanying drawings, which is only for the convenience of describing the present invention. The invention and simplified description do not indicate or imply that the device or element referred to must have a particular orientation, or be constructed and operate in a particular orientation, and therefore should not be construed as limiting the invention. Furthermore, the terms "first, second or third" are used for descriptive purposes only and should not be construed to indicate or imply relative importance.

Unless otherwise expressly specified and limited in the present invention, the terms "installation, connection, connection" should be understood in a broad sense. For example, it may be a fixed connection, a detachable connection or an integral connection; it may also be a mechanical connection, an electrical connection or a direct connection. The connection can also be indirectly connected through an intermediate medium, or it can be the internal communication between two elements. For those of ordinary skill in the art, the specific meanings of the above terms in the present invention can be understood in specific situations.

The present invention is described in detail in combination with schematic diagrams. When detailing embodiments of the present invention, for convenience of explanation, the section drawing representing the device structure will not be partially enlarged in accordance with the general proportion. Moreover, the schematic diagram is only an example, so the scope of protection of the present invention shall not be limited herein. In addition, in the actual production should include the length, width and depth of the three-dimensional dimensions.

Embodiment 1

Figure 1:
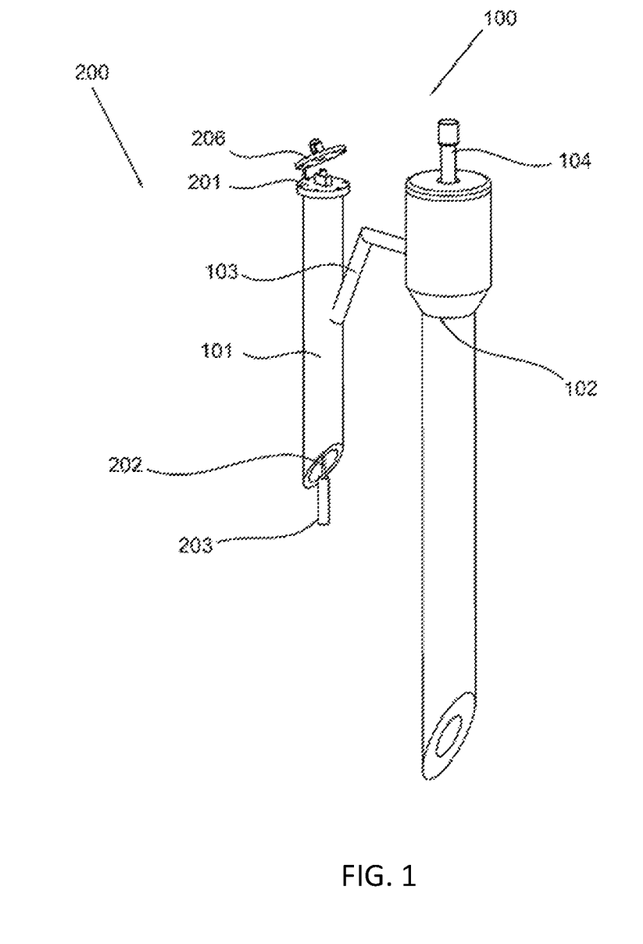
FIG. 1 is an overall structure diagram of the built-in multi-zone fast evenly mixed sampling device of the SCR outlet flue in accordance to an embodiment of the invention.

Referring to FIG. 1 in the following description, a built-in multi-zone fast evenly mixed sampling device of a Selective Catalytic Reduction (SCR) outlet flue includes: a sampling component 100, comprising a sampling branch pipe 101 disposed on an outer wall of the SCR outlet flue, a sampling pool 102 connected with the sampling branch pipe 101 and a slanting branch pipe 103 connected between the sampling pool 102 and the sampling branch pipe 101, wherein a sampling probe 104) is disposed on the sampling pool 102; a dust cleaning component 200, comprising a flange 201 disposed on an upper end of the sampling branch pipe 101, a connecting line 202 disposed on the flange 201 and a suspension iron 203 disposed on a lower end of the connecting line 202, wherein a lower end of the suspension iron 203 extends out of the sampling branch pipe 101; and a replacement component 400, disposed at the sampling pool 102.

More specifically, the main structure of the invention includes the sample component 100. In the embodiment, the sampling component 100 includes the sampling branch pipe 101 disposed on the outer wall of the flue, wherein the sampling branch pipe 101 can be coated with anti-wear coating, and the windward side is equipped with anti-wear angle steel. In the embodiment, the sampling branch pipe 101 is welded on the outer wall of the flue, and a slanting branch pipe 103 extends upward slantingly from the side wall of sampling branch pipe 101. A sampling pool 102 is installed near the side and top of the boiler, and a sampling probe 104 is disposed on the sampling pool 102.

As preferred, the sampling branch pipe 101, sampling mother pipe and sampling pool 102 are all made of 304 material or above grade material. Anti-wear angle steel material is Q345 material or above grade material. The sampling branch pipe 101 should be installed vertically inside the horizontal flue, and a sampling inlet at the end of sampling branch pipe 101 should be anti-face to an open slanting groove windward side of smoke.

The main structure of the invention further includes the dust cleaning component 200. The dust cleaning component 200 includes a flange 201 disposed on an upper end of the sampling branch pipe 101. The flange 201 is connected to the sampling pipe thread. At the same time, a connecting line 202 is also connected to the flange 201, and the connecting line 202 extends from the inside of the sampling branch pipe 101. A suspension iron 203, capable of swinging, is disposed to a lower end of the connection line 202. Suspended iron 203 is free to shake under the impact of its own gravity and smoke, so as to achieve dust dynamic self-cleaning.

Moreover, the main structure of the invention further includes the replacement component 400. The replacement component 400 is disposed at the sampling pool 102.

The sampling device offers the advantage of the sampling branch 101 to the sampling mother tube, and further to the sampling pool 102, all being installed inside the flue, such that the following can be prevented: (1) water and ash in the flue gas condensing due to temperature drop and then clogging the sampling tube; (2) ammonium bisulfate blocking the sampling branch pipe 101 and CEMS smoke sampling probe 104 due to temperature drop; (3) fly ash accumulating inside the sampling branch pipe, because instead it can be dynamically cleaned by the suspension iron 203.

For example, a built-in multi-zone fast evenly mixed sampling device of a Selective Catalytic Reduction (SCR) outlet flue is used at the exit of a SCR denitration device of a 660MW coal-fired unit. Eight smoke (flue gas) sampling tubes are installed in the flue duct section of the reactor outlet on each side of the SCR device. Each sampling tube is inserted into the flue duct section of the outlet according to two specifications (L=1400 mm, 3100 mm, diameter φ57×3.5 mm), and each tube samples smoke sampling in multiple zones as set. Each sampling branch pipe is incorporated into the horizontally installed sampling mother pipe (φ157×3.5 mm) for initial mixing, and the sampling mother tube turns downward and enters the fast evenly mixed sampling pool (φ325×11 mm), and further slows down the mixing. Then, the sampling mother tube vertically passes through the bottom of the flue, accessing the dust collector inlet flue, such that suction is generated by the differential pressure of flue gas between the denitration outlet and the inlet of the dust collector. The sampling and mixing of CEMS flue gas are completed inside the flue. After this modification, the flue gas (NOx concentration and ammonia escape concentration) sampling's representativeness, accuracy, and timeliness are significantly enhanced, and there is no obvious ash accumulation therein during one maintenance cycle.

Embodiment 2

Referring to FIG. 1 to FIG. 5, the differences of the embodiment 2 from the embodiment 1 are that: a hole matching with the connecting line 202 is disposed on an upper end of the flange 201, a winding rod 204 used for winding the connecting line 202 is disposed on the flange 201, a threaded rod 205 is disposed on an upper end of the winding rod 204, an end cover 206 is rotationally connected to the flange 201, and a matching hole 207 matching with the winding rod 204 is disposed on the end cover 206. Furthermore, a clamp block 208 is disposed on the end cover 206, a thread cap 209 is disposed in the clamp block 208, and an internal thread matching with thread on the thread rod 205 is disposed in the thread cap 209. Moreover, a mixing component 300, disposed in the sampling pool 102, and the mixing component 300 includes: a plurality of stirring rods 301, rotationally connected in the sampling pool 102; a plurality of blades 303, disposed on the stirring rods 301; and a vent hole 302 disposed on each of the stirring blades 303, wherein a rear end of the vent hole 302 is connected to a vent pipe.

Figure 2:
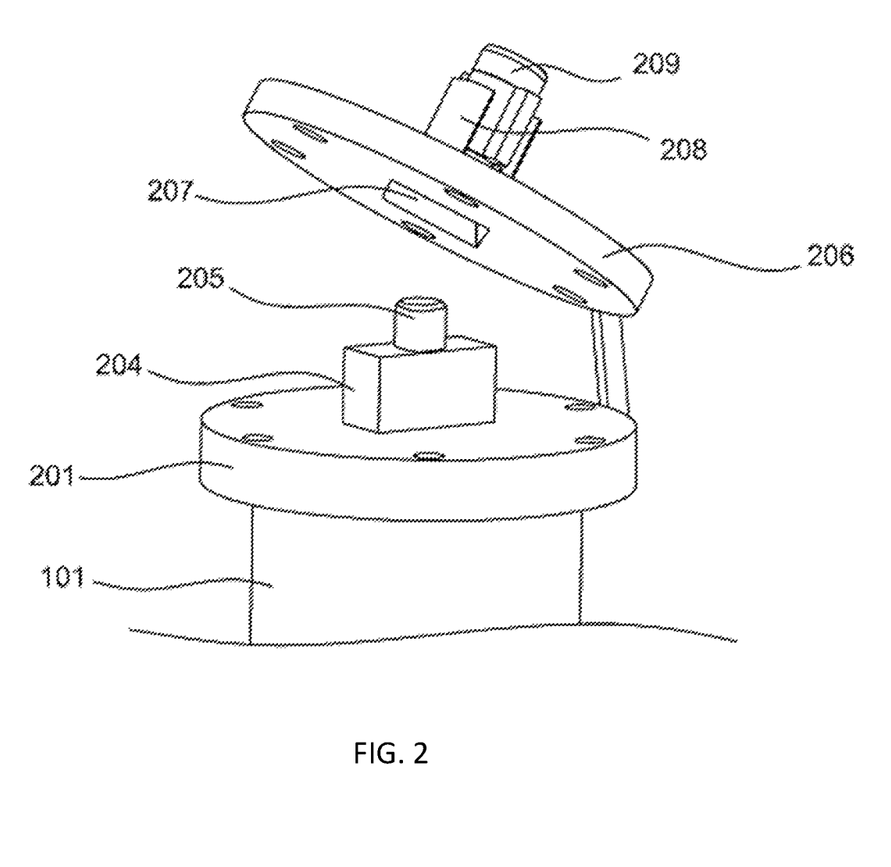
FIG. 2 is a structure diagram of a flange of the built-in multi-zone fast evenly mixed sampling device of the SCR outlet flue in accordance to an embodiment of the invention.

More specifically, a hole that allows the connection line 202 to pass through is disposed on an upper end of the flange 201, and the hole also limits the swing range of the connecting line 202, so as to prevent the suspension iron 203 from swinging too widely and hitting the sampling branch pipe 101. Furthermore, a winding rod 204 is disposed on an upper end surface of the flange 201, which is used for winding the end of the connecting line 202. A threaded rod 205 is disposed on an upper end of the winding rod 204, and an end cover 206 is rotationally connected to the flange 201, wherein the rotation plane of the end cover 206 is disposed vertically, and a matching hole 207 for matching the winding rod 204 is opened on the end cover 206, wherein the shape of the winding rod 204 is a rectangular strip, and the shape of the matching hole 207 is the same as the side shape of the winding rod 204.

Furthermore, a clamp block 208 is disposed on the end cover 206, and a thread cap 209 is disposed in the clamp block 208, wherein an internal thread matching with threading on the thread rod 205 is disposed in the thread cap 209, such that the end cover 206 can be stuck first, and then the thread cap 209 can be turned to lock the connecting line 202.

Figure 4:
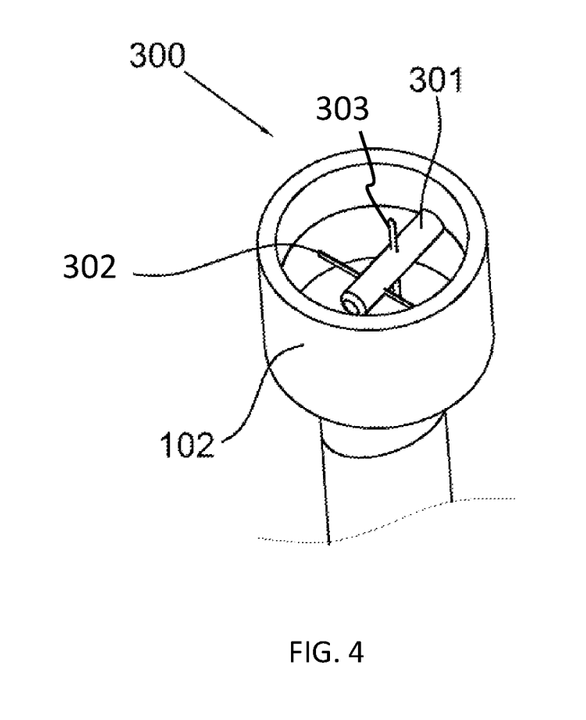
FIG. 4 is a structure diagram of a stirring component of the built-in multi-zone fast evenly mixed sampling device of the SCR outlet flue in accordance to an embodiment of the invention.

Moreover, a mixing component 300 is disposed in the sampling pool 102, wherein the mixing component 300 includes: a plurality of stirring rods 301, rotationally connected to the sampling pool 102; a plurality of blades 303, disposed on the stirring rods 301; and a vent hole 302, disposed on each of the stirring blades 303, wherein the rear end of the vent hole 302 is connected to a vent pipe.

Embodiment 3

Referring to FIG. 1 to FIG. 5, the differences of the embodiment 3 from the foregoing embodiments 1 and 2 are that the replacement component 400 includes: a fixed plate 401, rotationally connected to a side end of a bottom plate; a sliding rod 402, disposed at a lower end of the fixed plate 401; and a sliding sleeve 403, slidingly connected on the sliding rod 402, wherein a matching rod 404, which is slanted outwards, is fixed on the sliding sleeve 403, wherein a sliding block 405, slidingly connected on the matching rod 404, wherein a receiving rod 406 is fixed on the receiving block 405, and a replacement part 600 is disposed on an end of the receiving rod far away the matching rod 404. Furthermore, the sliding rod's 402 end extends outwards with a connecting block 501, and the connecting block 501 is rotationally connected to a driving block 502, wherein, along with a horizontal direction, the driving block 502 is slidingly connected with a connecting rod 503, wherein a connecting plate 504 is disposed on an end of the connecting rod 503 away from the driving block 502, and the connecting plate 504 is rotationally connected with a lower end of the receiving block 405, wherein an elastic part 505 is disposed between the connecting rod 503 and the driving block 502, and a driving part 506 connecting to the driving block 502 is disposed on the fixing plate 401. Moreover, the replacement part 600 includes: a pressing block 601, slidingly connected to an end of the receiving rod 406; a pressing rod 602 disposed on the pressing block 601; and a contact block 603, disposed on an end away from the pressing block 601, wherein a contact rod extends from the contact block 603 contact a bump part, and a rotating part 604 is disposed on an end of the receiving rod 406. A spring 607 is disposed between the contact block 603 and the receiving rod 406, an end of the pressing rod 602 is provided with flanging, and an annular groove is disposed on a receiving plate.

Figure 3:
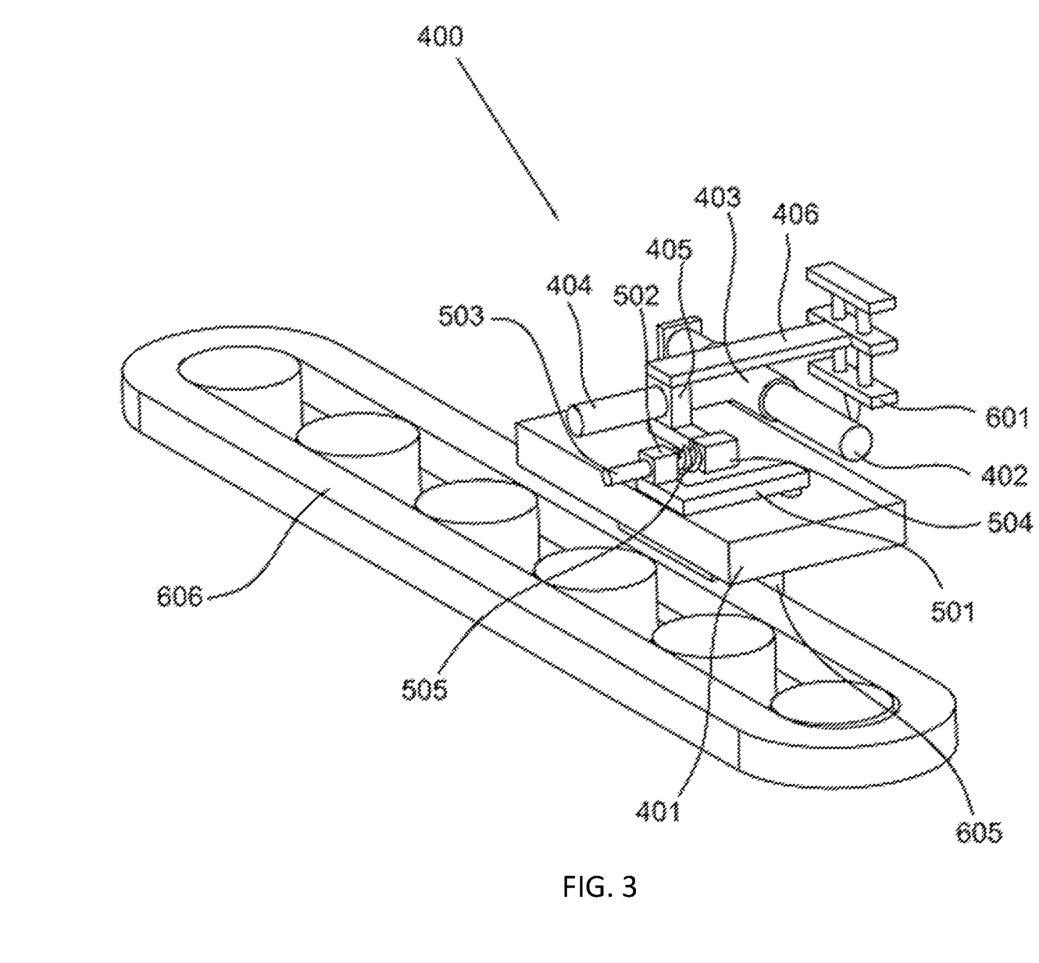
FIG. 3 is a structure diagram of a replacement component of the built-in multi-zone fast evenly mixed sampling device of the SCR outlet flue in accordance to an embodiment of the invention.

More specifically, in the embodiment, the replacement component 400 includes a fixed plate 401 rotationally connected to a side end of a bottom plate, wherein the fixed plate 401 is set parallel to a receiving plate. A sliding rod 402 is disposed at a lower end of the fixed plate 401, wherein the sliding rod 402 is set along the width direction of the receiving plate, that is the width direction of the conveyor belt 606. A sliding sleeve 403 slidingly connected on the sliding rod 402, wherein a matching rod 404, which is slanted outwards, is fixed on a side wall of the sliding sleeve 403. The matching rod 404 is set to tilt, but remain horizontal, and the angle between the matching rod 404 and the sliding rod 402 is 90 degrees. A sliding block 405 is slidingly connected on the matching rod 404, wherein the receiving block 405 also extends a receiving rod 406 in the opposite direction to the matching rod 404. The receiving rod 406 is mainly responsible for packaging, and it is capable of being used as the connection support part of the front end of the replacement part 600.

To implement the driving block, a connecting block 501 is disposed at the sliding rod's 402 end, and the connecting block 501 extends outwards, wherein the extending direction of the connecting block 501 is the same as the extending direction of the matching rod 404. The connecting block 501 is rotationally connected to a driving block 502, and the rotation plane of the driving block 502 is set horizontally. Along with being set in a horizontal direction, the driving block 502 is slidingly connected with a connecting rod 503. A connecting plate 504 is disposed on an end of the extending connecting rod 503, and the connecting plate 504 is rotationally connected (e.g., by hinge joint) with a lower end of the receiving block 405. Furthermore, an elastic part 505 is disposed between the connecting rod 503 and the driving block 502, such that connecting rod 503 can be reset quickly.

Moreover, in the embodiment, a driving part 506 connecting to the driving block 502 is disposed on the fixing plate 401, wherein the driving part 506 is a motor in this embodiment.

Figure 5:
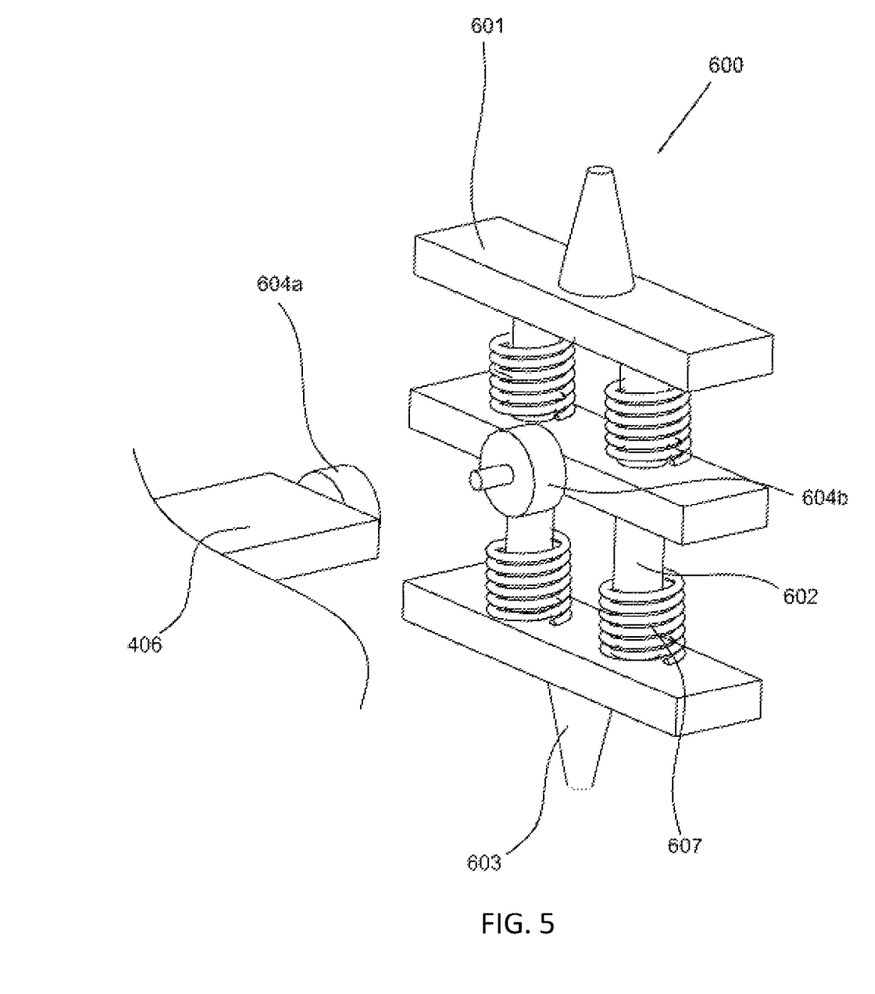
FIG. 5 is a structure diagram of a replacement part of the built-in multi-zone fast evenly mixed sampling device of the SCR outlet flue in accordance to an embodiment of the invention.

Likewise, in the embodiment, the replacement part 600 includes a pressing block 601 slidingly connected to an end of the receiving rod 406, wherein a pressing rod 602 is disposed on a surface of the pressing block 601, and the back end of the pressing block 601 is connected to two rods, wherein the rods are slidingly connected to end of the receiving rod 406, while the other ends of the rods extend outward with the receiving rod 406 and are connected to the contact block 603.

In addition, a contact rod extending from the contact block 603 contacts a bump part. A spring 607 is disposed between the contact block 603 and the receiving rod 406, wherein the spring 607 keeps the receiving rod 406 in a downward pressed state. An end of the pressing rod 602 is provided with flanging, and an annular groove is disposed on a receiving plate. When the pressing rod 602 is pressed downward, the flanging matches the annular groove, such that the sampling probe can be removed conveniently.

Moreover, a sliding block 605 is disposed on a lower end of the fixing plate 401, a conveyor belt 606 is disposed on the bottom plate, and the sliding block 605 is fixed on the conveyor belt 606, such that the whole replacement component 400 can be replaced easily.

The remaining structure is the same as those in the Embodiment 2.

Operation process: The operator drives the stepping motor to make the driving block 502 rotate, and then by rotating the connecting rod 503 to drive the movement of the receiving rod 406. Then, with the ensuring movement and swinging, two adjacent sampling probes 104 can be taken out in the same position, increasing the efficiency.

It is important to note that the construction and layout of this application shown in a number of different embodiments is only exemplary. While the above descriptions have detailed several different implementation plans, an ordinarily skilled person in the art will appreciate that other structural and functional configurations and applications are possible and readily adoptable without undue experimentation and deviation from the spirit of the present invention. (For example, various components' size, scale, structure, shape and proportion, as well as parameter values (for example, temperature, pressure, etc.), installation layout, use of materials, color, orientation changes, etc.). For example, an element shown to be formed as a whole may be composed of multiple parts or elements, the position of which may be inverted or otherwise altered, and the nature or number or position of discrete elements may be altered or altered. Therefore, all such variants are intended to be included within the scope of the invention. The order or sequence of any process or method steps can be changed or reordered according to alternative embodiments. Any "device plus function" clause in a claim is intended to cover the structure described herein for performing the said function, and is not only structurally equivalent but also an equivalent structure. Other substitutions, modifications, changes and omissions may be made in the design, health and layout of exemplary embodiments without departing from the scope of the present invention. Therefore, the present invention is not limited to specific embodiments but extends to a variety of variants still falling within the scope of the attached claims.

In addition, in order to provide a concise description of exemplary embodiments, all features of the actual embodiments may be omitted (that is, those that are not relevant to the best mode currently under consideration for the implementation of the invention, or those that are not relevant to the implementation of the invention).

It should be understood that, during the development of any practical embodiment, as in any engineering or design project, a number of specific embodiment decisions can be made. This endeavor may be complex and time consuming, but for those ordinary technicians who benefit from this disclosure, there will be no need for much experimentation, and development will be a routine effort of design, manufacturing, and production.

Finally, the foregoing description of the present invention has been provided for the purposes of illustration and description. It is not intended to be exhaustive or to limit the invention to the precise forms disclosed. Many modifications and variations will be apparent to a practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A built-in multi-zone fast evenly mixed sampling device of a Selective Catalytic Reduction (SCR) outlet flue, comprising:
    a sampling component (100), comprising a sampling branch pipe (101) disposed on an outer wall of the SCR outlet flue, a sampling pool (102) connected with the sampling branch pipe (101) and a slanting branch pipe (103) connected between the sampling pool (102) and the sampling branch pipe (101), wherein a sampling probe (104) is disposed on the sampling pool (102);
    a dust cleaning component (200), comprising a flange (201) disposed on an upper end of the sampling branch pipe (101), a connecting line (202) disposed on the flange (201) and a suspension iron (203) disposed on a lower end of the connecting line (202), wherein a lower end of the suspension iron (203) extends out of the sampling branch pipe (101); and
    a replacement component (400), disposed at the sampling pool (102).

2. The built-in multi-zone fast evenly mixed sampling device of the SCR outlet flue of claim 1, wherein
    a hole matching with the connecting line (202) is disposed on an upper end of the flange (201),
    a winding rod (204) used for winding the connecting line (202) is disposed on the flange (201),
    a threaded rod (205) is disposed on an upper end of the winding rod (204),
    an end cover (206) is rotationally connected to the flange (201), and
    a matching hole (207) matching with the winding rod (204) is disposed on the end cover (206).

3. The built-in multi-zone fast evenly mixed sampling device of the SCR outlet flue of claim 2, wherein
    a clamp block (208) is disposed on the end cover (206),
    a thread cap (209) is disposed in the clamp block (208), and
    an internal thread matching with thread on the thread rod (205) is disposed in the thread cap (209).

4. The built-in multi-zone fast evenly mixed sampling device of the SCR outlet flue of claim 3, further comprising:
    a mixing component (300), disposed in the sampling pool (102),
    wherein the mixing component (300) comprises:
        a plurality of stirring rods (301), rotationally connected in the sampling pool (102);
        a plurality of blades (303), disposed on the stirring rods (301); and
        a vent hole (302) disposed on each of the stirring blades (303),
        wherein a rear end of the vent hole (302) is connected to a vent pipe.

5. The built-in multi-zone fast evenly mixed sampling device of the SCR outlet flue of claim 1, wherein
    the replacement component (400) comprises:
        a fixed plate (401), rotationally connected to a side end of a bottom plate;
        a sliding rod (402), disposed at a lower end of the fixed plate (401); and
        a sliding sleeve (403), slidingly connected on the sliding rod (402),
        wherein a matching rod (404), which is slanted outwards, is fixed on the sliding sleeve (403),
        wherein a sliding block (405), slidingly connected on the matching rod (404),
        wherein a receiving rod (406) is fixed on the receiving block (405), and
        a replacement part (600) is disposed on an end of the receiving rod far away the matching rod (404).

6. The built-in multi-zone fast evenly mixed sampling device of the SCR outlet flue of claim 5, wherein
    the sliding rod's (402) end extends outwards with a connecting block (501), and the connecting block (501) is rotationally connected to a driving block (502),
    wherein, along with a horizontal direction, the driving block (502) is slidingly connected with a connecting rod (503),
    wherein a connecting plate (504) is disposed on an end of the connecting rod (503) away from the driving block (502), and the connecting plate (504) is rotationally connected with a lower end of the receiving block (405),
    wherein an elastic part (505) is disposed between the connecting rod (503) and the driving block (502), and
    a driving part (506) connecting to the driving block (502) is disposed on the fixing plate (401).

7. The built-in multi-zone fast evenly mixed sampling device of the SCR outlet flue of claim 6, wherein
    the replacement part (600) comprises:
        a pressing block (601), slidingly connected to an end of the receiving rod (406);
        a pressing rod (602) disposed on the pressing block (601); and a contact block (603), disposed on an end away from the pressing block (601),
wherein a rotating part (604) is disposed on an end of the receiving rod (406).

8. The built-in multi-zone fast evenly mixed sampling device of the SCR outlet flue of claim 7, wherein
the rotating part (604) comprises:
a first rotating plate (604*a*); and
a second rotating plate (604*b*) rotationally connected with the first rotating plate (604*a*),
wherein a stepping motor connected with the second rotating plate (604*b*) is disposed inside the first rotating plate (604*a*).

9. The built-in multi-zone fast evenly mixed sampling device of the SCR outlet flue of claim 8, wherein
a sliding block (605) is disposed on a lower end of the fixing plate (401),
a conveyor belt (606) is disposed on the bottom plate, and
the sliding block (605) is fixed on the conveyor belt (606).

10. The built-in multi-zone fast evenly mixed sampling device of the SCR outlet flue of claim 9, wherein
a spring (607) is disposed between the contact block (603) and the receiving rod (406),
an end of the pressing rod (602) is provided with flanging, and
an annular groove is disposed on a receiving plate.

* * * * *